Figure 1:
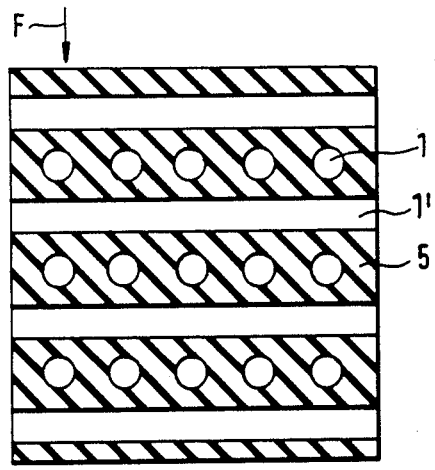

United States Patent [19]

Wolf et al.

[11] Patent Number: 4,750,720
[45] Date of Patent: Jun. 14, 1988

[54] SPRING ELEMENT

[75] Inventors: Franz J. Wolf; Hubert Pletsch, both of Bad Soden-Salmünster, Fed. Rep. of Germany

[73] Assignee: WOCO Franz-Josef Wolf & Co., Fed. Rep. of Germany

[21] Appl. No.: 833,585

[22] Filed: Feb. 26, 1986

[51] Int. Cl.⁴ .................................. F16F 15/08
[52] U.S. Cl. .................................. 267/219; 267/35; 267/140.1; 267/141; 267/152; 267/153; 267/292
[58] Field of Search ............ 267/8 R, 35, 63 R, 63 A, 267/140.1, 140.3, 152, 153, 181, 141, 140, 141.6; 5/450, 461, 468, 481; 297/DIG. 1; 248/634, 562, 615, 638; 181/288, 207, 371–377

[56] References Cited

U.S. PATENT DOCUMENTS

| 2,750,606 | 6/1956 | Freedlander et al. | 5/450 X |
| 3,191,896 | 6/1965 | Nathan | 267/153 X |
| 3,209,380 | 10/1965 | Watsky | 5/461 |

FOREIGN PATENT DOCUMENTS

| 0723596 | 8/1942 | Fed. Rep. of Germany | 267/153 |
| 3017379 | 11/1981 | Fed. Rep. of Germany | 5/468 |
| 52-37675 | 3/1977 | Japan . | |
| 351167 | 2/1961 | Switzerland | 5/481 |

Primary Examiner—Douglas C. Butler
Attorney, Agent, or Firm—Lowe, Price, LeBlanc, Becker & Shur

[57] ABSTRACT

A spring element comprising a resilient block interspersed with mutually parallel channels has an especially soft spring characteristic, since the block is interspersed with at least two series of channels mutually crossing in space without intersecting each other.

4 Claims, 1 Drawing Sheet

SPRING ELEMENT

DESCRIPTION

The invention relates to a spring element in block form made of a resilient material, such as elastomer material, interspersed with channels. A "block" in the sense of the present description is a formed body of any geometric configuration. Thus, the block may be cubic, barrel or cylindrical shaped, or formed as a element (e.g., a disc, a slab, a foil or a belt). A "channel" as used in the present specification is a cylindrical bore or an elongate recess for the elastomer block extending straight, bent or corrugated. In most cases, however, the channels will have the shape of straight cylindrical bores. On the outer surfaces of the elastomer block the channel may be closed on both sides, may be open on one side or may be open on both sides thereof.

A flat spring element of the type in question, namely a mattress for furniture, particularly for a couch or bed, is known from the German Laying-Open Specification DE No. 30 17 379 A1. The spring element is a flat slab-like cuboid having large elongate cavities the longitudinal axis of which extends parallel to the load vector carried by the spring element. The cavities are mainly cylindrical shaped with semi-spherical caps on both of its sides. The cavities on their upper side, lower side and in their mid section are connected to a network of channels, each network consisting of two series of channels comprising mutual parallel channels, and in which network the channels of each of the two series intersect in one and the same plane. This known spring element is not apt to carry a larger load in a resilient manner. In case of a load exceeding a certain upper limit the elastomer forming the block, particularly a sponge elastomer, will no longer be elastically deformed, but instead the walls of the large volume cavities will bend and kink in a direction transverse to the load vector acting upon the spring element. Such bending or kinking of the cavity wall results in a non-resilient compression of the elastomer block. The known spring element thus is not feasible for solving technical spring problems, where larger loads are to be carried.

Japanese published patent application JP No. 52-37675 A discloses a hydraulic damper having the shape of a sheet-like damping element which in this form is used either as bumpers for vehicle bodies, ship-hulls and the like or is used in belt-like shape as a damper support for railway rails. In such belt-type dampers the cavities therein have the shape of upright standing cylinders interconnected by linear pipes or channels allowing for a restricted cross section communication among the cylindrical cavities. In the case of a sheet-like shape of the damper, the upright standing cylindrical cavities are mutually connected by a network of such throttle channels, the mutually intersecting throttle channels forming a structure of hexagonal symmetry. Each of the cavities bound into this throttle channel network is intersected by or communicates with three linear channels in one and the same plane lying at about the half height of the upright standing cylinders. In other words, each of the cavities of the known sheet-type damper element is provided with six small openings all arranged in one and the same plane and communicating via linear throttle pipes or channels to the six nearest adjacent cylindrical cavities. Such a throttle channel network is intended to provide a damper characteristic which is independent from the direction of load acting on the damper element in two dimensions perpendicular to the effective load vector. Such known damper elements are of the hydrodamper type, i.e. all channels and cavities formed in the elastomer block of the damper are filled with a damping liquid.

The channel network formed in the mattress spring body disclosed in German Laying-Open-Specification DE No. 30 17 379 A1 and the crossing and intersecting channel network structures formed in the rigid foamed polystyrene body disclosed in the U.S. Pat. No. 3,209,380 A both serve the purpose of improving the venting and the climatization of a mattress structure comprising said mattress spring body and said foamed rigid polystyrene body, respectively.

Apart from kinking it is a further disadvantage of the known rubber spring bodies interspersed with the channels or series of channels in turn intersecting cavities or not, that such spring bodies must be made by hand work technologies by layer-bonding and laminating methods in a time consuming and ineffective manner of production.

Having regard of such state of the art it is an object of the invention to provide a spring body made of an elastic material interspersed with channels, which spring body, on the one hand, shall be mechanically resistant, stable and strong so as to also carry larger loads while providing spring support without taking any harm, particularly without the appearance of any wall kinking effects in its body, and which spring element, on the other hand, has a significantly soft spring characteristic, i.e., a significantly flat slope of its spring characteristic over a broad range of elastic recovery and without showing a drop of said spring characteristic caused by kinking effects, and which spring element finally shall lend itself to a simpler, more economic and more effective method of producing same.

For solving this object a spring body is provided, characterized in that a block made of an elastic material is interspersed with at least two series of channels crossing over in space without mutually intersecting.

It is thus an essential feature of the invention that the elastic block, in most cases a shaped rubber body, forming the spring body, is interspersed with a series of channels mutually crossing over whereat, however, said channels do not intersect as known from all prior art structures in which a block of an elastomer material is interspersed with a set or series of channels. In contrast thereto, in the spring element of the invention the channels are crossing at different planes in space, so that they do not intersect. It necessarily follows from the above that each individual of any set of cavities possibly additionally formed in the elastomer block is intersected by only one single channel rather than by any multitude of channels. Such a geometrical distribution of the channels over the elastomer block and, if that may be the case, such a distribution of the additional cavities in the elastomer block interspersed by one single channel, on the one hand results in an elastomer spring body, which is mechanically strong rather than weak even under a considerable load that is to be resiliently carried in spite of a quite considerable pore volume without showing any kinking effects, especially when the load is acting in a direction perpendicular to the planes defined by the plane of each series of channels, and, on the other hand, the deformation stress lead into the spring body from the load, preferably in a plane perpendicular to the vector of the load and coinciding with the plane of the series of channels, is highly homogeneously distributed over the complete elastomer block, on a macroscopic scale. Therefore, even when choosing a quite strong and mechanically stable type of elastomer the spring element made from such a material shows a spring characteristic comprising a broad section of proportionality characterized by a significantly softly or slowly rising slope. The section of proportionality then continuously and smoothly turns into a section of progression at its end of higher loads, i.e. to a section where the load is a super-linear function rather than a linearly proportional function of the spring deflection. The spring characteristic of the spring element according to the invention is free from sections having either a negative slope or even superimposed effects giving rise to a negative slope, which features of the spring characteristic are indications of the occurrence of kinking effects in the spring element.

According to a preferred embodiment of the invention the spring element is characterized in that the channels of at least one series of mutually parallel channels aligned in one plane in the elastomer block intersect cavities also formed in the elastomer block, the maximum free cross-section of which cavities in a plane perpendicular to the axis of the channels is larger than the cross-section of the channels in this very plane, while said cavities have a ratio of axis perpendicular to and parallel to the channels axis, respectively, in the range of 1:3 to 3:1, preferably of at least about 1:1. Additionally, the channels intersect the cavities so that the centre of the cavity lies right on the central axis of the channel while all cavities intersected by one and the same channel are equally spaced from each other with reference to the channel axis. Additionally, and this is an essential feature of this embodiment of the invention, there is at least one series of channels having an invariable cross-section over their total length, i.e. there is at least one series of channels not intersecting any cavities in addition to the one series of channels which do intersect cavities formed in the elastomer block.

It is a surprising feature of the spring element of the invention that the elastomer block interspersed with the channels and optionally additionally with cavities of the type identified above forming the spring element show an exceptionally good acoustic damping, which effect is thought to result from scattering effects occuring on the inner channel walls and, if that may be the case, at inner walls of the cavities formed in the elastomer block. Such a good acoustic damping additionally is due to the fact that as a consequence of the arrangement of the channels and the cavities, if there are any, hardly any significant bridges of elastomer material are left directly running from one side to the other of the spring body, so that no acoustic waves can pass over directly through the elastomer material from one side to the other.

According to a further embodiment of the invention the cross-section of the channels extending through the elastomer block are preferably of circular shape. Apart from this the cross section can also be elliptic or polygonal. In the case where the channel cross-section is not rotationally symmetric, the longest axis of the cross-section area of the channel preferably is directed parallel to the vector of the load acting onto the spring element; the "longest axis" referred to is in the unloaded state of the spring element. In case the cross-section of the channel is not rotationally symmetric, it is preferably of elliptic shape.

According to a further especially effective embodiment of the invention at least one series of channels formed in the elastomer block intersect cavities also formed in the block, the largest free cross-section of which cavities in a plane normal to the channel axis is larger than the cross-sectional area of the channels in said plane, while the cross-sectional diameters of said cavity perpendicular and parallel to the channel axis have a ratio in the range from 1:3 to 3:1, especially at least about 1:1, while simultaneously the channels do intersect the cavities so that the centers of the cavities are located well on the central axis of the channels, and whereat all cavities intersected by one and the same channel, based on the channel axis, are equally spaced from each other. Simultaneously at least one further series of channels have an invariant cross-sectional area over their total length. In other words, at least one series of channels of this embodiment of the invention do not communicate with cavities having a free diameter or cross-section larger than the free cross-sectional area or diameter of the channels. The main advantage of a spring element according to this embodiment of the invention is that it lends itself to a safe, effective and easy method of production. This means that the channelled rubber block forming the spring element can be made by compression moulding, injection moulding or transfer moulding using a re-usable moulding core which easily can be pulled out of the rubber block when removing the shaped spring body out of the mould.

In addition to their unique spring characteristic, the spring element of the invention also exhibits good damping characteristics. According to another embodiment of the invention this can be obtained by filling a part of the channels and/or channels intersecting cavities formed in the elastomer block with a damping material, especially with a damping liquid of adjustable viscosity.

Figures 2, 3:
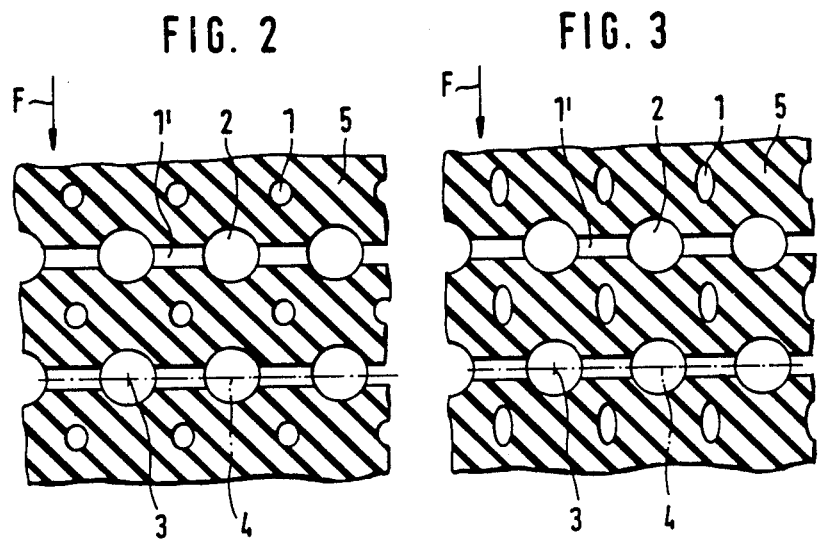

The invention is described in more detail below by referring to various embodiments of the spring element. The invention is explained with reference to the drawings in which FIG. 1 is a cross-section through a first embodiment of a rubber spring body;

FIG. 2 is a cross-section through a second embodiment of the spring element; and FIG. 3 is a cross-section through a third embodiment of the spring element.

A first embodiment of the spring element according to the invention is shown in a cross-section in FIG. 1. An elastomer block 5 is interspersed with two series of channels 1,1'. Each of the channels has a cylindrical shape. The channels are open on both ends and are arranged parallel to each other in each of that two series of channels. The channels belonging to each of said two series are arranged in superimposed planes in such a manner that the distance between two neighbouring channels of one and the same series in one and the same plane of channels is equal to the distance from one channel belonging to one series to the nearest channel in the following plane comprised by the other series of channels. In other words, in the embodiment shown in FIG. 1 and with respect to the cross-sectional representation shown there, the plurality of the cross-sections of channels 1 form or represent a simple cubic lattice. The same applies to the channels 1' shown in their longitudinal cross-section in FIG. 1.

Channels 1 and 1' of both series of channels cross at right angles without intersecting. Thus, each one of the planes of channels 1 and 1' of each series of channels are also parallel to each other.

The spring body of the invention in FIG. 1 typically serves as a bearing support, and preferably in such an orientation that the load vector to be carried at least substantially is perpendicular to the plane defined by the series of channels 1 and 1', respectively.

This orientation is schematically shown in FIG. 1 by means of arrow F. When observing such a relative orientation of the position and direction of channels 1, 1' with respect to the load vector F, no kinking effects whatsoever will occur in the spring element as they usually are occurring in formed elastic bodies and in spring elements provided with large volume cavities or in spring elements the elastic body of which is interspersed with hollow channels that intersect regularly, for instance, when forming a hexagonal pattern. Such kinking effects, as explained earlier, give rise to a loss of elasticity, and it is one of the most prominent features of the spring of the invention that such kinking effects do not occur.

With respect to a buffer made of the same solid material the spring element shown in FIG. 1 comprises a substantially softer and slowly rising slope of the spring characteristic without having a lower mechanical strength as the said buffer made of solid material.

A further embodiment of the spring element is shown in FIG. 2 in a cross-section according to FIG. 1. Both series of channels 1 and 1' are corresponding in the way they are arranged, aligned and distributed in the elastomer block 5 to the arrangement, alignment and distribution of the channels 1, 1' of the embodiment of the invention shown in FIG. 1, which is explained in detail above. The difference between the FIG. 1 and FIG. 2 embodiments is that the latter includes cavities 2 of spherical shape formed in the elastomer block 5, which cavities are interspersed with the channels 1' in such a way, that the centers 3 of the cavities of spherical shape 2 are located at the central axis 4 of the channels 1'. All cavities 2 interspersed with the channels 1' are equally spaced from each other, based on the central axis 4 of the channels 1'; that distance is equal to the distance of the channels 1' from each other and equal to the distance of the channels 1 from each other as well. Thus, cavities 2 in FIG. 2 form a simple cubic lattice. The channels 1 are according to the embodiment shown in FIG. 1 straight channels of cylindrical shape and do not intersect any cavities.

With respect to the embodiment shown in FIG. 1 the spring element according to FIG. 2 has a substantially softer spring characteristic which is linear in a broader range and which spring element comprises a substantially improved acoustic damping. That improvement of the acoustic damping is thought to be a result from acoustic scattering effects at the inner walls of the cavities 2. These remarkable advantages with respect to the spring element shown in FIG. 1 are available without having to accept considerably higher production expenses caused by the additional formation of the cavities 2 in the elastomer block 5. When producing the spring element shown in FIG. 2 the elastomer block 5 can be obtained by compression molding or injection molding in a mold which is interspersed with two series of reuseable molding cores, exactly with cylindrical rods which are forming the channels 1 and with beads which are forming the channels 1' including the cavities 2.

This is valid for the spring elements shown in FIG. 1 and FIG. 3 as well. When taking the shaped rubber spring body out of the mold in a first step the series of molding cores forming the channels 1 can be easily pulled out of the rubber block and in a second step the series of molding cores forming the channels 1' and the cavities 2 are pulled, whereat the elastomer block 5 released from the first series of molding cores can change its shape expandingly, so that the spheres of the bead forming the cavities 2 can be pulled out of the elastomer block 5 through the sections of the channels 1' in between without any complications.

In the embodiment of the invention shown in FIG. 2 the spring element, when being used as a bearing support, is preferably aligned in such a way that the vector of the load shown by means of the arrow F is perpendicular to the planes defined by the series of channels 1 and 1'.

When a load acts upon the spring element according to FIG. 1 as well as FIG. 2, the channels 1 and 1' change their shapes, whereat the spring element obtains its typical characteristic. Load induced deformation occurs in such a way that the channels of the spring element which are cylindrical when unloaded are pressed into an elliptic shape. Under large loads in a critical case the channels are entirely pressed together, so that their inner walls touch each other. On the other hand this leads to a deterioration of the acoustic damping of the spring element, and on the other hand this may cause problems if a certain part of the channels 1 or 1' are filled with a damping material, preferably a damping liquid, for damping mechanical effects. Loads causing a total compression of the cross-section of the channels have to be considered practically as limiting loads for obtaining the advantages of the invention. The value of this limiting load can be shifted easily up to larger values by appropriate measures of geometric design which is particularly important if the bearing support is to be used with initial stress. An embodiment of such a spring element suitable for carrying larger loads is schematically shown in FIG. 3. In that spring element (unloaded in FIG. 3 as well as in the other figures), the channels 1 have a cross-section of elliptic or oval shape such, that the major axis of the cross-section is at least substantially parallel to the vector F of the load. The channels 1' can be formed in the same way with a cross-section which has a longer dimension parallel to the vector F of the load. However it is emphasized, that the cross-sections of the channels 1 and 1' of both of the series of channels formed in the elastomer block must not be the same for both of the series of channels. An expert rather has the possibility without any problems to adapt the spring element to the requirements of the use according to the requirements of the intended application.

In contrast to the FIG. 2 embodiment, the channels 1 and if necessary the channels 1' of the spring element in FIG. 3 are pressed and deformed into circular shape under increasing load, prior to further compression of the channels into flat shape as occurs in the spring element in FIG. 2. In other words, the spring element in FIG. 3 can be additionally loaded by a load which is necessary to press and deform the cross-section of oval shape when unloaded to a cross-section of circular shape.

If the spring element has to comprise in addition to that intensified damping facilities, a certain part of the channels, under some circumstances, are filled with a damping material, especially a damping liquid. Filling all of the channels and/or the cavities with a damping material is disadvantageous since the spring element would then lose its desired soft characteristic and would not be different from any hydro-damper.

The filling of the channels and/or the cavities with the damping liquid can be in such a way that each channel is filled separately and then is closed hermetically, but it can be accomplished alternatively in such a way that the whole spring element is put into a tank filled with damping liquid or is connected to it in such a way, that only the channels and/or cavities to be filled can communicate with the tank filled with damping liquid. The corresponding connections can be formed as separate parts and can be formed as parts vulcanized to the spring element as well. For example if all channels 1' with the accompanying cavities 2 according to FIG. 3 are to be filled with a damping liquid, the right and left side-walls of the elastomer block 5 according to FIG. 3 are formed like a double-walled chamber, whereat all channels 1' lead in said chamber formed by the side-walls which serves as a support chamber and as a by-pass chamber.

As a damping material preferably a damping liquid is used which comprises a variable and adjustable viscosity, such as a visco-elastic or a visco-plastic damping liquid.

In addition, the damping facilities of the spring element can be naturally influenced in a well-known manner when using a damping liquid by adjusting the geometric configuration by changing the cross-sections of the throttle channels and the volumes of the cavities. Especially, the cavities may not have only a single configuration as shown e.g. in FIG. 2 and FIG. 3 by the exclusively spherical cavities, but they naturally can have different configurations and/or dimensions, whereat with respect to most of the applications it has to be regarded, that the individual cavity elements are distributed as evenly as possible over the elastomer block 5. In this connection it has to be ensured especially that the characteristic feature of the invention is provided, which means that the separate channels do not intersect each other and that they are preferably crossing over in spatially different planes forming in the radical plane equally spaced encircled angles.

We claim:

1. A spring element, comprising a block of elastic material interspersed with at least two series of channels mutually crossing in space without intersecting each other, wherein the channels of one series intersect a plurality of cavities (2) formed in the block (5), a largest free cross-section of said cavities in a plane normal to the channel axis being greater than the cross-section of the channels in the same plane, and said cavities further having a ratio of their diameters perpendicular to and parallel to the channel axis, respectively, in the range of about from 1:3 to 3:1, and wherein said channels (1') of one series intersect the cavities (2) so that the centers (3) of the cavities are located on a central axis (4) of said channels of one series, and wherein substantially all cavities (2) intersected by one and the same channel (1') in said one series with respect to the direction of the channel axis (4) are substantially equally spaced from each other, and wherein the channels of the other series of channels (1) have a substantially constant cross-section, in a non-compressed state, over their substantially entire length.

2. A spring element according to claim 1, wherein the channels (1, 1') and cavities (2) are equally distributed in space over substantially the entire volume of the elastomer block (5).

3. A spring element, comprising a block of elastic material interspersed with at least two series of channels mutually crossing in space without intersecting each other, wherein the channels of one series intersect a plurality of cavities (2) formed in the block (5), a largest free cross-section of said cavities in a plane normal to the channel axis being greater than the cross-section of the channels in the same plane, and said cavities further having a ratio of their diameters perpendicular to and parallel to the channel axis, respectively, in the range of about from 1:3 to 3:1, and wherein said channels (1') of one series intersect the cavities (2) so that the centers (3) of the cavities are located on a central axis (4) of said channels of one series, and wherein substantially all cavities (2) intersected by one and the same channel (1') in said one series with respect to the direction of the channel axis (4) are substantially equally spaced from each other, and wherein the channels of the other series of channels (1) have a substantially constant cross-section, in a non-compressed state, over their substantially entire length, said channels of said other series being non-circular in cross-section with respect to the unloaded and undeflected state of the spring element, a largest cross-sectional dimension of the channel cross-section of such channels of said other series being substantially oriented parallel with respect to a load vector resiliently supported under normal operating conditions, said load vector acting in a plane perpendicular to the axes of the channels of said other series.

4. A spring element according to claim 3, wherein the cross-section of the channels of said other series is elliptical or polygonal.

* * * * *